United States Patent
Boroschewski et al.

[15] 3,692,820
[45] Sept. 19, 1972

[54] METHYL AND ETHYL-N-[3-(3'-METHYLPHENYL-CARBAMYLOXY)-PHENYL]CARBAMATES

[72] Inventors: Gerhard Boroschewski; Friedrich Arndt; Reinhart Rusch, all of Berlin, Germany

[73] Assignee: Schering A.G., Berlin and Bergkamen, Germany

[22] Filed: Sept. 25, 1969

[21] Appl. No.: 861,198

[30] Foreign Application Priority Data

Apr. 9, 1965 Germany...............Sch 36854

Related U.S. Application Data

[63] Continuation of Ser. No. 536,283, March 22, 1966, abandoned.

[52] U.S. Cl..........260/472, 260/247.2 B, 260/326.3, 71/111

[51] Int. Cl......................C07c 79/46, C07c 101/00
[58] Field of Search..............................260/471, 472

[56] References Cited

UNITED STATES PATENTS 3,404,975  10/1968  Wilson et al.................71/100

*Primary Examiner*—Alex Mazel
*Assistant Examiner*—Jose Tovar
*Attorney*—Klein and Padlon and Joseph T. Padlon

[57] ABSTRACT

New phenyl carbamates are provided as herbicides, broadly effective against many types of weeds, particularly of the dicotyledenous type.

2 Claims, No Drawings

METHYL AND ETHYL-N-[3-(3'-METHYLPHENYL-CARBAMYLOXY)-PHENYL]CARBAMATES

This application is a streamlined continuation of Ser. No. 536,283, filed Mar. 22, 1966, now abandoned.

The invention relates to herbicidal agents. More particularly it refers to agents containing new, substituted phenyl carbamates.

In the field of herbicides, the action of phenyl carbamates, e.g., isopropyl-N-phenyl carbamate and isopropyl-N-(3-chlorophenyl) carbamate, is already known. However, these agents do not show a sufficiently broad effect. Important field weeds, such as groundsel, chamomile, and frenchweed, etc., are not controlled, or only unsatisfactorily so by such agents.

In accordance with the present invention, it has now been found that agents containing at least one compound of the general formula:

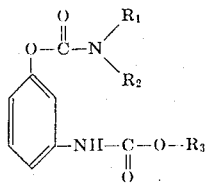

wherein $R_1$ represents alkyl, cycloalkyl, aryl possibly substituted by halogen and/or alkyl and/or trifluoromethyl; $R_2$ represents hydrogen or alkyl, $R_1$ and $R_2$ together with the N atom, a heterocyclic ring possibly containing additional N and/or O atoms, and $R_3$ represents alkyl, alkenyl, or alkinyl possibly substituted by halogen, in the end position; are broadly effective against a plurality of weeds, particularly also the dicotyledonous types of plants.

It is an object therefore, of the present invention to provide agents containing at least one compound of the foregoing general formula for effective action on undesirable plants.

The herbicidal effect of the compounds above generally indicated extends to their application both in pregermination and in postgermination treatment of plants and therefore, permits the use of the agents containing these compounds according to the desired type of application. Another advantage is the effectiveness in their contact treatment over or on the leaves of established weeds.

It has further been found that some of the compounds, particularly methyl-3-(3'-methylphenyl-carbamoyloxy)-phenyl-carbamate and ethyl-3-(phenylcarbamoyloxy)-phenyl-carbamate have a selective herbicidal effect and can be used, for example, for weed control in beet cultivation.

Compounds which can be used according to the invention are for example the following:

Ethyl-3-(2'-chlorophenyl-carbamoyloxy)-phenyl-carbamate
Beta-chlorethyl-3-(2'-chlorophenyl-carbamoyloxy)-phenyl-carbamate
Methyl-3-(3'-chlorophenyl-carbamoyloxy)-phenyl-carbamate
Ethyl-3-(3'-chlorophenyl-carbamoyloxy)-phenyl-carbamate
Methyl-3-(4'-chlorophenyl-carbamoyloxy)-phenyl-carbamate
Ethyl-3-(4'-chlorophenyl-carbamoyloxy)-phenyl-carbamate
n-Propyl-3-(4'-chlorophenyl-carbamoyloxy)-phenyl-carbamate
n-Butyl-3-(4'-chlorophenyl-carbamoyloxy)-phenyl-carbamate

| Compound No. | Name of Compound | Melting Point |
|---|---|---|
| 9 | Methyl-3-(2'-methylphenyl-carbamoyloxy)-phenyl-carbamate | 158–160°C |
| 10 | Ethyl-3-(2'-methylphenyl-carbamoyloxy)-phenyl-carbamate | 126–127°C |
| 11 | Beta-chlorethyl-3-(2'-methylphenyl-carbamoyloxy)-phenyl-carbamate | 129–130°C |
| 12 | 1-Butin-3-yl-3'-(3²-methylphenyl-carbamoyloxy)-pheny-carbamate | 140–141°C |
| 13 | 1-Butin-3-yl-3'-(4²-methylphenyl-carbamoyloxy)-phenyl-carbamate | 153–155°C |
| 14 | 1-Butin-3-yl-3'-(3²-trifluoromethylphenyl-carbamoyloxy)-phenyl-carbamate | 129–130°C |
| 15 | Ethyl-3-(diethylcarbamoyloxy)-phenyl-carbamate | 75–76°C |
| 16 | Ethyl-3-pentamethylen-carbamoyloxy)-phenyl-carbamate | 103.5–105.5°C |
| 17 | Ethyl-3-methyl-carbamoyloxy)-phenyl-carbamate carbamate | 131–132°C |
| 18 | Beta-Chlorethyl-3-methylcarbamoyloxy)-phenyl-carbamate | 127–128°C |
| 19 | n-Propyl-3-methylcarbamoyloxy)-phenyl-carbamate | 125–127°C |
| 20 | n-Butyl-3-methylcarbamoyloxy)-phenyl-carbamate | 111–112°C |
| 21 | Methyl-3-(n-butylcarbamoyloxy)-phenyl-carbamate | 114–115°C |
| 22 | Ethyl-3-(n-butylcarbamoyloxy)-phenyl-carbamate | 99.5°C |
| 23 | sec.-Butyl-3-(n-butylcarbamoyloxy)-phenyl-carbamate | 142–143°C |
| 24 | Methyl-3-(cyclohexylcarbamoyloxy)-phenyl-carbamate | 159–161°C |
| 25 | Ethyl-3-(cyclohexylcarbamoyloxy)-phenyl-carbamate | 128°C |
| 26 | Beta-Chlorethyl-3-(cyclohexy-carbamoyloxy)-phenyl-carbamate | 147–148°C |
| 27 | n-Propyl-3-(cyclohexylcarbamoyloxy)-phenyl-carbamate | 160°C |
| 28 | n-Butyl-3-(cylcohexylcarbamoyloxy)-phenyl-carbamate | 140–141°C |
| 29 | Ethyl-3-(3'-methylphenyl-carbamoyloxy)-phenyl-carbamate | 128–129°C |
| 30 | Beta-Chlorethyl-3-(3'-methylphenyl-carbamoyloxyloyl)-phenyl-carbamate | 118–119°C |
| 31 | Methyl-3-(4'-methylphenyl-carbamoyloxy)-phenyl-carbamate | 162–163.5°C |
| 32 | Ethyl-3-(4'-methylphenyl-carbamoyloxy)-phenyl-carbamate | 147–148°C |
| 33 | Ethyl-3-(3'-trifluormethylphenyl-carbamoyloxy)-phenyl-carbamate | 130–131°C |
| 34 | Beta-Chlorethyl-3-(3'-trifluormethylphenyl-carbamoyloxy)phenyl-carbamate | 132–133°C |
| 35 | 1-Butin-3-yl-(3'-methylcarbamoyloxy)-phenyl-carbamate | 157–159°C |
| 36 | 1-Butin-3-yl-(3'-cyclohexylcarbamoyloxy)-phenyl-carbamate | 146–147°C phenyl-carbamate |
| 37 | 1-Butin-3-yl-(3'-phenylcarbamoyloxy)-phenyl-carbamate | 164–166°C |

| | | |
|---|---|---|
| 38 | 1-Butin-3-yl-3¹-(2²-chlorophenyl-carbamoyloxy)-phenyl-carbamate | 134–136°C |
| 39 | 1-Butin-3-yl-3¹-(4²-chlorophenyl-carbamoyloxy)-phenyl-carbamate | 153–155°C |
| 40 | 1-Butin-3-yl-3¹-(2²-methylphenyl-carbamoyloxy)-phenyl-carbamate | 155–156°C |
| 41 | sec.-Butyl-3-(cyclohexylcarbamoyloxy)-phenyl-carbamate | 149–150°C |
| 42+) | Methyl-3-(phenylcarbamoyloxy)-phenyl-carbamate | 152°C |
| 43 | Ethyl-3-(phenylcarbamoyloxy)-phenyl-carbamate | 118–119°C |
| 44 | Beta-Chlorethyl-3-(phenylcarbamoyloxy)-phenyl-carbamate | 149–150°C |
| 45 | n-Propyl-3-(phenylcarbamoyloxy)-phenyl-carbamate | 125–126°C |
| 46 | Isopropyl-3-(phenylcarbamoyloxy)-carbamate | 133–135°C |
| 47 | n-Butyl-3-(phenylcarbamoyloxy)-phenyl-carbamate | 145°C |
| 48 | sec.-Butyl-3-(phenylcarbamoyloxy)-phenyl-carbamate | 145–147°C |
| 49 | Methyl-3-(2¹-chlorphenyl-carbamoyloxy)-phenyl-carbamate | 124–126°C |
| 50 | Methyl-3-(3¹-methylphenyl-carbamoyloxy)-phenyl-carbamate | 139–142°C |
| 51 | Morpholin-N-carboxylic acid-3-carbethoxy-aminophenylester | 114–115°C |
| 52 | Ethyl-3-(a-naphthyl-carbamoyloxy)-phenyl-carbamate | 150–151°C |
| 53 | Methyl-3-(a-naphthyl-carbamoyloxy)-phenyl-carbamate | 166–168°C |
| 54 | Ethyl-3-(3¹,4¹-dichlorophenyl-carbamoyloxy)-phenyl-carbamate | 154–155°C |
| 55 | Methyl-3-(methylcarbamoyloxy)-phenyl-carbamate | 126–127°C |
| 56 | Methyl-3-(3¹,¹-dichlorophenyl-carbamoyloxy)-phenyl-carbamate | 188–190°C |
| 57 | Methyl-3-(3¹-chloro-4¹-methylphenyl-carbamoyloxy)-phenyl-carbamate | 167–168°C |
| 58 | Ethyl-3-(3¹-chloro-4¹-methylphenyl-carbamoyloxy)-phenyl-carbamate | 150–151°C |
| 59 | n-Propyl-3-(ethylcarbamoyloxy)-phenyl-carbamate | 120°C |
| 60 | n-Propyl-3-(n-propylcarbamoyloxy)-phenyl-carbamate | 122°C |
| 61 | n-Propyl-3-(isopropylcarbamoyloxy)-phenyl-carbamate | 154°C |
| 62 | n-Propyl-3-(n-butylcarbamoyloxy)-phenyl-carbamate | 117°C |
| 63 | n-Butyl-3-(ethylcarbamoyloxy)-phenyl-carbamate | 112°C |
| 64 | n-Butyl-3-(isopropylcarbamoyloxy)-phenyl-carbamate | 129°C |
| 65 | n-Butyl-3-(n-butylcarbamoyloxy)-phenyl-carbamate | 108°C |
| 66 | Isopropyl-3-(ethylcarbamoyloxy)-phenyl-carbamate | 145.5–147°C |
| 67 | Isopropyl-3-(isopropylcarbamoyloxy)-phenyl-carbamate | 155.5–158°C |
| 68 | Isopropyl-3-(n-propylcarbamoyloxy)-phenyl-carbamate | 142–144°C |
| 69 | Isopropyl-3-(n-butylcarbamoyloxy)-phenyl-carbamate | 143–144°C |
| 70 | Isopropyl-3-(cyclohexylcarbamoyloxy)-phenyl-carbamate | 157.5–158.5°C |
| 71 | Methyl-3-(ethylcarbamoyloxy)-phenyl-carbamate | 148–151°C |
| 72 | Methyl-3-(isopropylcarbamoyloxy)-phenyl-carbamate | 156–159.5°C |
| 73 | Methyl-3-(n-propylcarbamoyloxy)-phenyl-carbamate | 142–144°C |
| 74 | Ethyl-3-(ethylcarbamoyloxy)-phenyl-carbamate | 146.5–149°C |
| 75 | Ethyl-3-(isopropylcarbamoyloxy)-phenyl-carbamate | 163–166°C |
| 76 | Ethyl-3-(n-propylcarbamoyloxy)-phenyl-carbamate | 134–137°C |
| 77 | n-Propyl-3-(tert.-butylcarbamoyloxy)-phenyl-carbamate | 164–165°C |
| 78 | Ethyl-3-(tert.-butylcarbamoyloxy)-phenyl-carbamate | 159–160°C |
| 79 | Methyl-3-(tert.-butylcarbamoyloxy)-phenyl-carbamate | 165–166°C |
| 80 | Isopropyl-3-(methylcarbamoyloxy)-phenyl-carbamate | 155.5–157°C |

The previously unknown compounds can be produced, for example, by the following methods:

By the reaction of N-hydroxyphenyl urethanes of the general formula

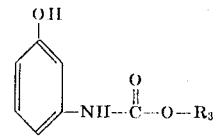

with a. isocyanates of the general formula $$R_1 - N = C = O$$

in the presence of a catalyst, preferably an organic base, such as triethylamine, or b. carbamic acid chlorides of the general formula

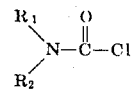

in the presence of an acid acceptor, most advantageously by the use of an inorganic or organic base preferably pyridine, wherein, $R_1$, $R_2$, and $R_3$ have the above mentioned meanings.

The following examples explain the production of the new phenyl carbamates.

EXAMPLE 1

Methyl-3-(phenylcarbamoyloxy)-phenyl-carbamate.

16.7 g (0.1 mole) of methyl-N-(3-hydroxyphenyl) carbamate are dissolved in 50 ml of tetrahydrofuran. After addition of 0.5 ml of triethylamine, the solution is admixed with 12 ml (0.11 mole) of phenyl isocyanate. After 20 hours at room temperature, crystallization of the carbamate is effected upon addition of light gasoline.

Yield: 27.5 g = 96% of the theoretical amount
M.p. = 152° C.
Analysis for $C_{15}H_{14}N_2O_4$
  Calculated: C = 62.90% H = 4.93% N = 9.78%
  Found: C = 62.62% H = 5.00% N = 9.69%

EXAMPLE 2

Ethyl-3-(pentamethylen-carbamoyloxy)-phenyl-carbamate carbamate.

14.5g(0.08 mole) of ethyl-N-(3-hydroxyphenyl) carbamate are dissolved in 30 ml of dry pyridine and the solution mixed with 13.1 g (0.088 mole) of piperidine-N-carboxylic acid chloride. After two hours at room temperature the product is heated on the steam bath for 90 minutes. Then the pyridine is evaporated under vacuum and the residue is taken up in ether and dilute soda lye with addition of ice. The ether solution is washed successively with water, dilute hydrochloric acid, water, and dilute $KHCO_3$ solution, the temperature being maintained at 0° C. by the addition of ice. After drying with sodium sulfate and extensive evaporation of the ether, the carbamate crystallizes upon addition of petroleum ether.

Yield: 15.8 g = 68% of the theoretical amount
M.p. = 103.5° to 105.5° C.
Analysis for $C_{15}H_{20}N_2O_4$
  Calculated: C = 61.65% H = 6.90% N = 9.59%
  Found: C = 61.18% H = 7.00% N = 9.56%

The new phenyl carbamates are slightly soluble or insoluble in water, benzene and gasoline, and moderately or easily soluble in acetone, isophorone, dimethyl formamide, and dimethyl sulfoxide.

The N-hydroxy-phenyl urethanes needed as starting products for their production, some of which are not as yet described in the literature, can be obtained in a manner known in itself, e.g., by N-acylation of m-aminophenol with the corresponding chloroformic acid esters, e.g., in a mixture of acetic ester and water with addition of magnesium oxide.

The production of one of the starting products is hereby described.

21.8 g (0.2 mole) of m-aminophenol and 5 g of magnesium oxide are taken up in 70 ml of water and 70 ml of acetic ester. While cooling to 10° to 15° C., one then adds drop by drop 26.5 g (0.2 mole) of chloroformic acid butin-(1)-yl-(3) ester with agitation, continuing to agitate for 30 minutes at room temperature. The excess magnesium oxide is then dissolved in dilute hydrochloric acid and the organic phase is washed neutral with small amounts of water and subsequently with dilute potassium bicarbonate solution. After drying with sodium sulfate and evaporation of the acetic ester under vacuum, the crude product is purified by dissolving in small quantity of ether, filtering of the ether solution, and then crystallizing the butin-(1)-yl-(3)-N-(3-hydroxyphenyl) carbamate by the addition of light gasoline.

Yield: 34 g = 83% of the theoretical amount
M.p. = 94° to 95° C.
Analysis for $C_{11}H_{11}NO_3$
  Calculated: C = 64.38% H = 5.40% N = 6.83%
  Found: C = 64.23% H = 5.59% N = 6.90%

By the same process the other N-hydroxyphenylurethanes required as starting products can also be produced some of which are listed in the following table:

| Compound | Melting Point |
| --- | --- |
| Methyl-N-(3-hydroxyphenyl) carbamate | 94–95 deg. C |
| Ethyl-N-(3-hydroxyphenyl) carbamate | 94–95 deg. C |
| n-Propyl-N-(3-hydroxyphenyl) carbamate | 71–73 deg. C |
| Isopropyl-n-(3-hydroxyphenyl) carbamate | 75–76 deg. C |
| n-Butyl-N-(3-hydroxyphenyl) carbamate | 87–88 deg. C |
| sec.-Butyl-N-(3-hydroxyphenyl) carbamate | 115–116.5 deg. C |
| Beta-chloroethyl-N-(3-hydroxyphenyl) carbamate | 87.5 deg. C |

The new phenyl carbamates can be used alone or as mixtures with each other and/or with other herbicides and/or other materials, such as fertilizers, for weed control.

Their application is advantageously effected in a manner customary for weed control in the form of preparations, such as powders, granulates, solutions emulsions or suspensions, with the addition of liquid and/or solid vehicles or diluents and possibly wetting, adhesion, emulsifying and/or dispersing aids.

The various preparations occur in any one or more of the forms customary for plant protectants with the use of liquid or solid inert vehicles or diluents and possibly the addition of surface-active substances.

As suitable liquid vehicles the organic solvents, such as isophorone, Decalin, tetralin, dimethylformamide and dimethyl sulfoxide, etc. have been used.

As solid vehicles there enter into consideration, for example, lime, kaolin, talcum, natural or synthetic silicic acid, Atta clay and other clays.

Surface-active substances found suitable with the herein described agents are, for example, salts of lignin sulfonic acid, salts of alkylated benzene sulfonic acids, sulfonated acid amides and their salts, polyglycols, polyethoxylated amines, alcohols, and phenols.

For selective weed control, quantities of about 0.3 kg of active ingredient per hectare have in part proved sufficient. The herbicidal action of the agents according to the invention is evident from the following test examples.

EXAMPLE 3

In the greenhouse, the compounds listed in the following table were sprayed on mustard and tomatoes as test plants in a quantity of 10 kg of active ingredient per hectare, suspended in 800 liters of water per hectare. In contrast to isopropyl-N-phenyl carbamate as control, destruction of the test plants was achieved.

| Compound No. | Mustard | Tomatoes |
| --- | --- | --- |
| 1 | 0 | 1 |
| 2 | 0 | 1 |
| 3 | 0 | 0 |
| 4 | 0 | 0 |
| 5 | 0 | 5 |
| 6 | 0 | 1 |
| 7 | 0 | 7 |
| 8 | 0 | 7 |
| 9 | 0 | 0 |
| 10 | 1 | 9 |
| 11 | 0 | 3 |
| 12 | 0 | 2 |
| 13 | 0 | 1 |
| 14 | 0 | 1 |
| 15 | 0 | 0 |
| 16 | 0 | 0 |
| 17 | 0 | 0 |
| 18 | 1 | 7 |
| 19 | 0 | 1 |
| 20 | 0 | 0 |
| 21 | 0 | 1 |
| 22 | 0 | 0 |
| 23 | 0 | 6 |
| 24 | 0 | 0 |
| 25 | 0 | 0 |
| 26 | 1 | 1 |
| 27 | 0 | 5 |
| 28 | 0 | 7 |
| 29 | 0 | 0 |

EXAMPLE 4

In the greenhouse, with purpose of killing weed while in the cotyledon stage of crops and weeds, the compounds listed in the table were sprayed in a quantity of 1 kg of active ingredient per hectare, suspended in 800 liters of water per hectare, on the following plant species. As can be noticed from the results, the control isopropyl-N-(3-chlorophenyl)-carbamate has only a slight effect compared with the agents according to the invention.

| Compound No. | | | |
|---|---|---|---|
| 30 | 0 | 1 | |
| 31 | 0 | 1 | |
| 32 | 0 | 0 | |
| 33 | 0 | 0 | |
| 34 | 0 | 1 | |
| 35 | 1 | 4 | |
| 36 | 0 | 0 | |
| 37 | 0 | 1 | |
| 38 | 0 | 1 | |
| 39 | 0 | 1 | |
| 40 | 0 | 0 | |
| 41 | 1 | 4 | |
| 42 | 0 | 0 | |
| 43 | 0 | 0 | |
| 44 | 0 | 1 | |

| Compound No. | Peas | Sugar beets | Carrots | Onions | Sinapis arvensis | Solanum ssp. | Varianella ssp. | Stellaria media | Galinsoga parviflora | Senecio vulgaris | Matricaria chamomilla |
|---|---|---|---|---|---|---|---|---|---|---|---|
| 3 | 10 | 10 | 10 | 10 | 1 | 2 | 0 | 4 | 4 | 1 | 5 |
| 4 | 10 | 10 | 10 | 10 | 0 | 0 | 0 | 1 | 2 | 0 | 1 |
| 9 | 10 | 10 | 10 | 10 | 4 | 10 | 1 | 4 | 2 | 3 | 1 |
| 20 | 10 | 0 | 10 | 10 | 1 | 1 | 0 | 0 | 0 | 0 | 0 |
| 21 | 10 | 5 | 7 | 10 | 0 | 1 | 0 | 0 | 0 | 0 | 0 |
| 22 | 10 | 4 | 7 | 10 | 0 | 4 | 0 | 0 | 0 | 0 | 0 |
| 24 | 10 | 7 | 7 | 10 | 0 | 3 | 0 | 0 | 0 | 0 | 0 |
| 25 | 10 | 0 | 10 | 10 | 0 | 0 | 0 | 0 | 0 | 1 | 0 |
| 29 | 10 | 10 | 10 | 10 | 0 | 5 | 0 | 0 | 0 | 0 | 0 |
| 42 | 10 | 10 | 10 | 10 | 0 | 7 | 0 | 1 | 0 | 2 | 2 |
| 43 | 10 | 10 | 10 | 10 | 0 | 0 | 0 | 0 | 0 | 5 | 10 |
| 50 | 10 | 10 | 10 | 10 | 0 | 4 | 0 | 0 | 0 | 0 | 0 |
| 55 | 8 | 2 | 8 | 10 | 0 | 1 | 0 | 0 | 0 | 0 | 0 |
| 67 | 10 | 2 | 10 | 10 | 0 | 0 | 0 | 0 | 1 | 2 | 0 |
| 80 | 10 | 10 | 10 | 10 | 0 | 10 | 0 | 0 | 0 | 4 | 0 |
| Isopropyl-N-(3-chlorphenyl)-carbamate | 7 | 10 | 10 | 10 | 5 | 10 | 10 | 7 | 10 | 10 | 10 |

NOTE.— 0 = completely destroyed.  10 = no effect.

| Compound No. | | |
|---|---|---|
| 45 | 0 | 1 |
| 46 | 0 | 2 |
| 47 | 0 | 1 |
| 48 | 0 | 1 |
| 49 | 0 | 2 |
| 50 | 0 | 0 |
| 51 | 1 | 0 |
| 52 | 0 | 0 |
| 53 | 0 | 1 |
| 54 | 1 | 1 |
| 55 | 0 | 0 |
| 56 | 2 | 4 |
| 57 | 0 | 1 |
| 58 | 1 | 3 |
| 59 | 0 | 0 |
| 60 | 0 | 0 |
| 61 | 0 | 0 |
| 62 | 0 | 0 |
| 63 | 0 | 0 |
| 64 | 1 | 0 |

EXAMPLE 5

In the greenhouse, by treatment the crops and weeds, before their germination, the listed compounds were sprayed in a quantity of 0.3 kg of active ingredient per hectare, suspended in 800 liters of water per hectare, on bare sandy soil. The results evidence the better effect of the agents of the invention on stubborn weed species, such as, frenchweed (*Galinsoga parviflora*), groundsel (*Senecio vulgaris*) and chamomile (*Matricaria chamomilla*), which are not controllable with the control isopropyl-N-(3-chlorophenyl)-carbamate.

| Compound No. | Peas | Sugar beets | Carrots | Onions | Sinapis arvensis | Solanum ssp. | Varianella ssp. | Stellaria media | Galinsoga parviflora | Senecio vulgaris | Matricaria chamomilla |
|---|---|---|---|---|---|---|---|---|---|---|---|
| 21 | 10 | 10 | 10 | 10 | 4 | 10 | 10 | 0 | 1 | 1 | 1 |
| 24 | 10 | 0 | 10 | 4 | 0 | 0 | 0 | 0 | 0 | 0 | 0 |
| 25 | 10 | 10 | 10 | 10 | 0 | 0 | 0 | 0 | 0 | 0 | 0 |
| Isopropyl-N-(3-chlorphenyl)-carbamate | 10 | 10 | 10 | 10 | 10 | 0 | 10 | 0 | 10 | 10 | 10 |

NOTE.—0 = completely destroyed.  10 = no effect.

| Compound No. | | |
|---|---|---|
| 65 | 0 | 1 |
| 66 | 3 | 3 |
| 67 | 0 | 0 |
| 68 | 0 | 0 |
| 69 | 0 | 0 |
| 70 | 0 | 1 |
| 71 | 0 | 2 |
| 72 | 0 | 0 |
| 73 | 0 | 1 |
| 74 | 0 | 3 |
| 75 | 0 | 5 |
| 76 | 0 | 1 |
| 77 | 0 | 0 |
| 78 | 0 | 0 |
| 79 | 0 | 0 |
| 80 | 0 | 3 |
| Isopropyl-N-phenyl-carbamate | 7 | 8 |

0 = completely destroyed
10 = no effect

EXAMPLE 6

In the open field, crops and weeds in the 2–4 leaf stage were sprayed with aqueous emulsions or suspensions of the compounds listed in the following table in quantities of 2 and 5 kg of active ingredient per hectare. The crops treated were sugar beets and peas. The growth of weeds consisted of the important annual field weeds Sinapis ssp., Papaver ssp., Chenopodium album, Spergula arvensis, Centaurea ssp., Senecio vulgaris, Galinsoga parviflora and Lamin amplexicaule. As can be seen from the table, the control isopropyl-N-(3-chlorophenyl) carbamate has only a weak postgermination effect without selectivity in comparison with the agents according to the invention.

The agents produced according to Examples 7 and 8 may be used after the mixing with water as aqueous

| Compound No. | Kg./ hectare | Peas | Sugar beets | Sinapis arvensis | Papaver ssp. | Cheno- podium alb. | Spergula arv. | Centaurea ssp. | Senecio vulg. | Galinsoga parviflora | Lamium ampl. |
|---|---|---|---|---|---|---|---|---|---|---|---|
| 21 | 2 | 10 | 0 | 0 | 0 | 0 | 0 | 0 | 0 | 0 | 0 |
|  | 5 | 10 | 0 | 0 | 0 | 0 | 0 | 0 | 0 | 0 | 0 |
| 24 | 2 | 10 | 0 | 0 | 0 | 0 | 0 | 0 | 0 | 0 | 0 |
|  | 5 | 10 | 0 | 0 | 0 | 0 | 0 | 0 | 0 | 0 | 0 |
| 25 | 2 | 10 | 0 | 0 | 0 | 0 | 0 | 0 | 0 | 0 | 0 |
|  | 5 | 10 | 0 | 0 | 0 | 0 | 0 | 0 | 0 | 0 | 0 |
| 43 | 2 | 10 | 10 | 0 | 0 | 0 | 0 | 0 | 0 | 0 | 0 |
|  | 5 | 10 | 10 | 0 | 0 | 0 | 0 | 0 | 0 | 0 | 0 |
| 50 | 2 | 10 | 10 | 0 | 0 | 0 | 0 | 0 | 0 | 0 | 0 |
|  | 5 | 10 | 10 | 0 | 0 | 0 | 0 | 0 | 0 | 0 | 0 |
| Isopropyl-N-(3-chlorphen-yl)-carbamate | 2 | 7 | 10 | 9 | 9 | 9 | 6 | 10 | 10 | 10 | 10 |
|  | 5 | 7 | 5 | 7 | 8 | 6 | 3 | 10 | 10 | 10 | 10 |

NOTE.—10=not damaged. 0=completely destroyed.

EXAMPLE 7

The following is an example illustrating an emulsion concentrate in which the components were mixed together preferably in the order given.
20 % by weight of one of the new phenyl carbamates
15 % by weight of emulsifier on a base of polyglycol
45 % by weight of isophorone
15 % by weight of tetralin
5 % by weight of dimethyl sulfoxide

EXAMPLE 8

A dispersible wettable powder was made by mixing the following listed components together with the aid of an air jet mill:
50% by weight of one of the new phenyl carbamates
15% by weight of calcium lignin sulfonate
35% by weight of talcum emulsions or suspensions as herein above indicated.

From the foregoing, it will be noted that in accordance with the invention, many new substituted phenyl carbamates have been disclosed which show a broad herbicidal effect making them highly useful in the selective cultivation of plants.

While many examples of the preferred types of herbicidally effective substituted phenyl carbamates have been given, it is to be understood that modifications as to the molecular arrangement according to the genelic formula herein above given may be made without departing from the spirit and scope of the invention as claimed

We claim:
1. Methyl-3-(3'-methylphenyl-carbamoyloxy-phenylcarbamate.
2. Ethyl-3-(3'-methylphenyl-carbamoyloxy)-phenylcarbamate.

* * * * *